Inventor
WOODROW W. EVERETT

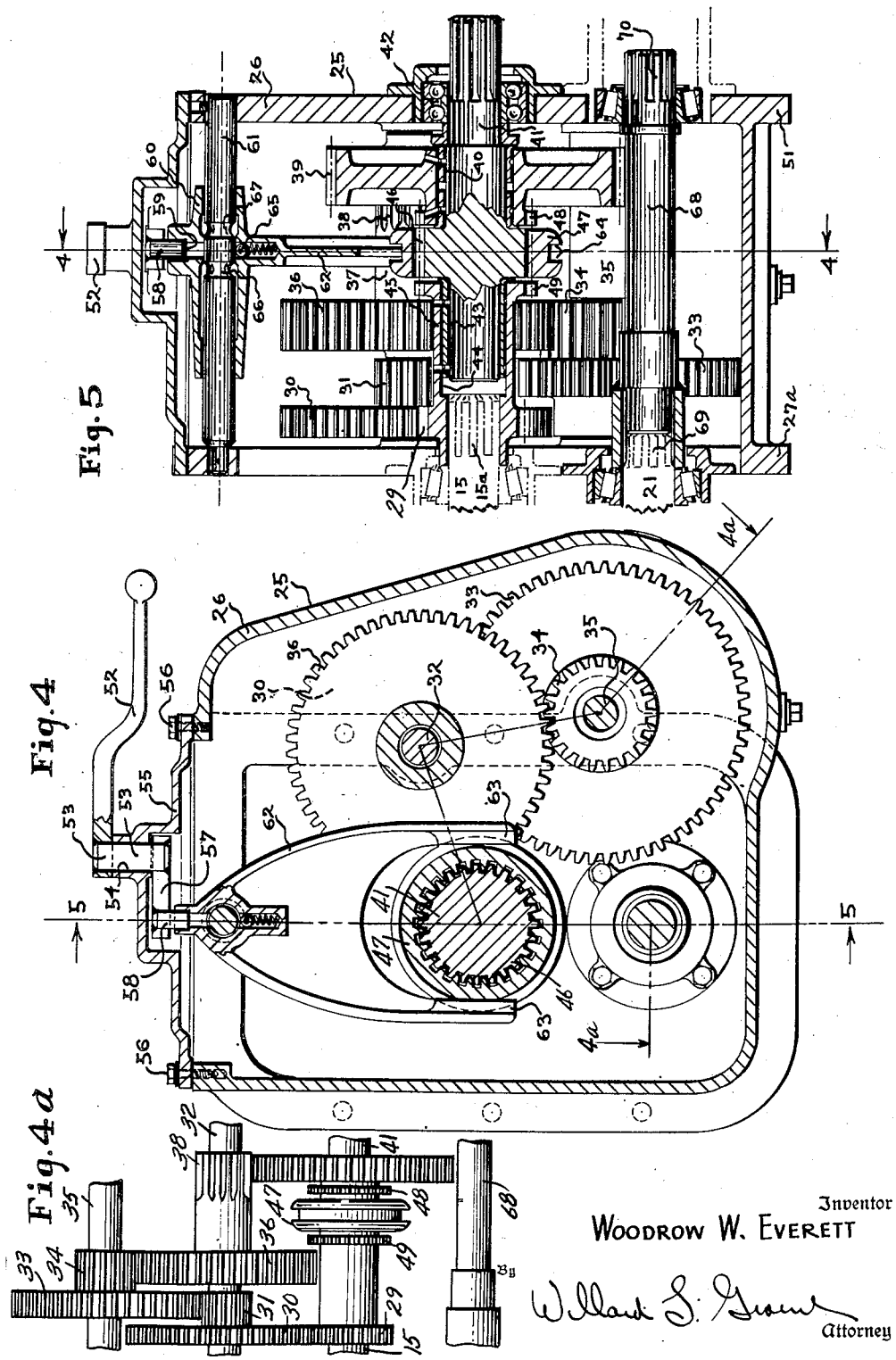

Inventor
WOODROW W. EVERETT
By Willard S. Groene
Attorney

Patented Nov. 11, 1952

2,617,314

UNITED STATES PATENT OFFICE 2,617,314

TRENCHING MACHINE TRANSMISSION

Woodrow W. Everett, Phoenix, Ariz., assignor to The Tractor Sales Corp., Los Angeles, Calif., a corporation of California Application May 16, 1949, Serial No. 93,470

6 Claims. (Cl. 74—665)

This invention relates to excavating machines and is particularly directed to trenching or ditching machines employing a supporting frame and an endless chain bucket line carrying a series of excavating buckets mounted on an ordinary tractor.

One of the objects of this invention is to provide an excavating device including an auxiliary transmission which shall be a self-contained unit adapted for use with farm tractors which is of simple, compact and durable mechanical construction, and which may be readily attached to or removed from the tractor proper.

Another object of my invention is to provide a combined tractor and excavating device in which the operating parts are severally associated through a transmission system of novel arrangement to a common actuating or impelling device.

Another object of this invention is to provide an excavating device especially adapted for digging ditches in which the cutting or excavating mechanism is adjustable relative to its supporting frame structure to vary the depth of excavation to control the profile of the bottom of the ditch being cut.

Another object of this invention is to provide a novel arrangement for adapting a trenching mechanism to an ordinary tractor in which the tractor may operate at normal traveling speeds or at a slow feeding speed for actuating the trench mechanism while cutting a ditch.

A further object of this invention is to provide an improved mounting for the endless chain bucket line to substantially eliminate vibration in the tractor and excavating device mounted on it while at the same time maintaining a greater number of excavating buckets in cutting contact with the ditch being cut.

And a still further object is to provide an improved hydraulic control system for positioning the boom or supporting frame for profile control and for bodily moving the trenching device to a withdrawn position on the tractor when it is to be transported to another working location by the tractor.

Further features and advantages of this invention will appear from the following detailed description of the drawings in which:

Figure 4 is an enlarged transverse section of the auxiliary low speed transmission indicated by the line 4—4 in Figures 1, 2, and 5.

Fig. 4a is a diagrammatic section on the line 4a—4a of Fig. 4.

Figure 5 is a section on the line 5—5 of Figure 4.

Figure 8:
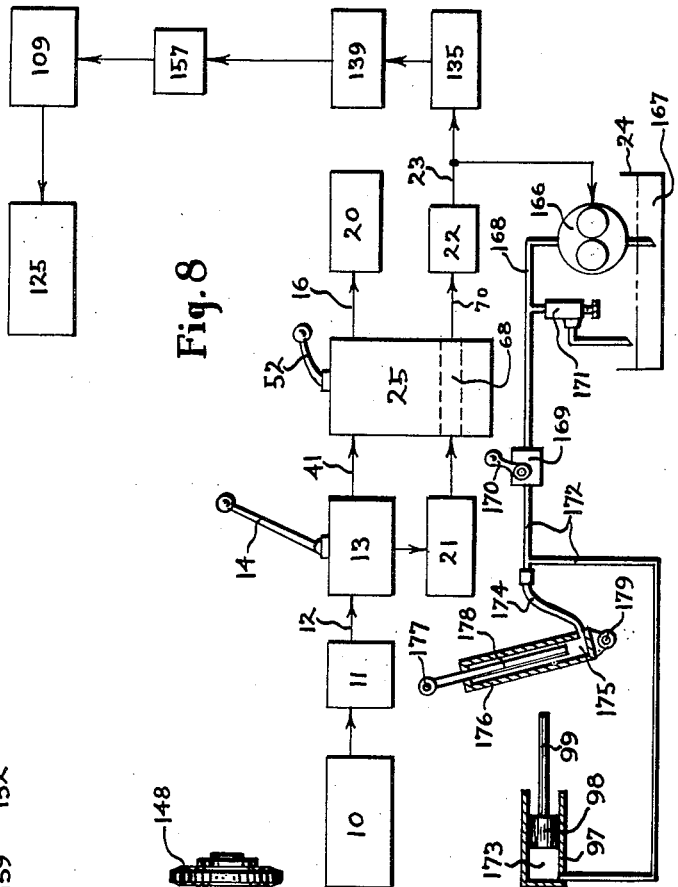
Fig. 8 is a diagram showing the essential elements and their operative association in the trenching apparatus.

For illustrative purposes this invention is shown applied to a conventional farm tractor having the usual internal combustion engine 10 and main drive clutch 11, shown diagrammatically in Figure 8, which connects power from the engine to the input shaft 12 of the usual change speed and reversing transmission 13 controlled from the gear shift lever 14. Such a transmission has the usual output shaft 15 which is connected to the propeller shaft 16 having the bevel pinion 17 which drives the differential ring gear for application of power to the tractor axles 19 and the main driving wheels 20. The transmission 13 also has the usual back gear shaft 21 which connects through a disconnect clutch 22 to the power take-off shaft 23 extending to the rear of the differential housing 24 in a well known convential manner.

Figure 1:
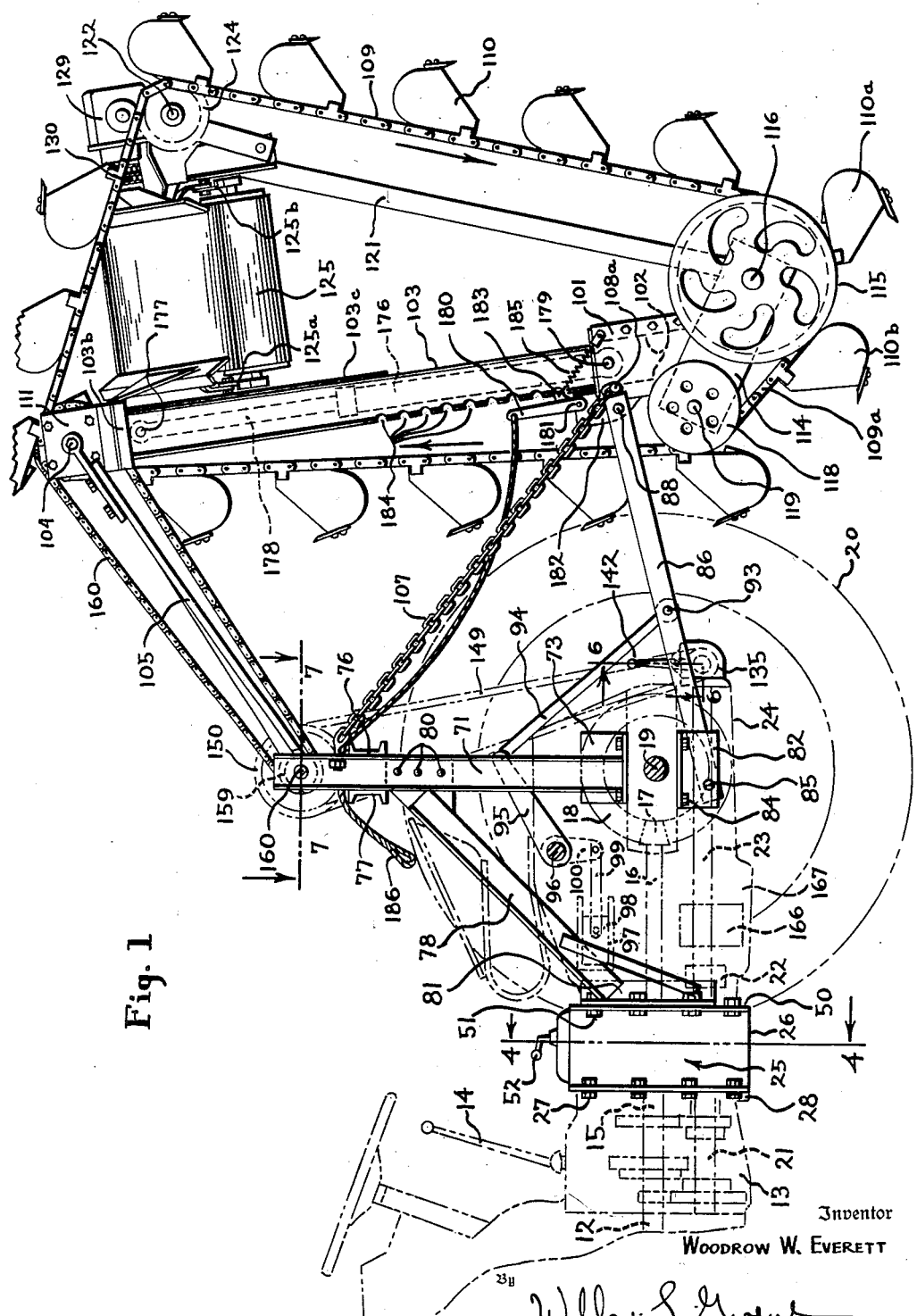
Figure 1 is an enlarged side elevation of the trenching device shown applied to a conventional farm tractor.

In order to provide a suitable slow speed drive for feeding the tractor along while the trencher is in operation cutting a ditch, there is provided an auxiliary low speed transmission indicated generally at 25. Referring particularly to Figures 1, 4, and 5, the auxiliary transmission 25 has a housing 26 which has a flange portion 27a secured by suitable bolts 27 to the rear flange 28 of the regular transmission 13 so that power from the shaft 15 of the regular transmission is connected through the splined connection 15a to a gear 29 secured to the shaft 15. The gear 29 in turn drives a large gear 30 to which is fixed the smaller gear 31 both of which gears are journaled on a shaft 32 fixed in the transmission housing 26. The gear 31 in turn drives the gear 33 which has fixed to it a small pinion gear 34, both of which gears 33 and 34 are journaled on a shaft 35 fixed in the housing 26. The gear 34 in turn drives the gear 36 which is fixed to a shaft 37 journaled on the fixed shaft 32. A pinion gear 38 is cut in the shaft 37 and meshes with the gear 39 which is journaled on the bearing portion 40 of the output shaft 41 of the auxiliary transmission. The aforementioned drive gearing causes the gear 39 to rotate at a much slower rate, preferably in the range of 100 to 1 relative to the speed of rotation of the shaft 15.

The shaft 41 of the auxiliary transmission is journaled in a suitable ball bearing 42 in the housing 26 and is supported on its other bearing portion 43 in a counter bore 44 formed in the extended sleeve portion 45 of the gear 29. On the shaft 41 is formed a gear portion 46 upon which is slidably mounted the mating splined clutch spool 47. On the hub of the gear 39 is formed a gear 48 identically the same diameter and number of teeth as the gear 46. Formed on the sleeve portion 45 of the gear 29 is formed a gear 49 which is also the same size as the gears 46 and 48. Thus when the clutch spool 47 is moved axially to the right in Figure 5 it will engage over the gear 48 to cause the shaft 41 to be rotated very slowly relative to the shaft 15 to effect the feeding movement of the tractor while digging a trench. When the clutch spool 47 is moved to the left to engage over the gear 49 the shaft 41 will be directly connected to the shaft 15 for conventional traveling speeds for the tractor.

The shaft 41 is connected to the regular propeller shaft 16 in the differential or rear axle housing 24, which housing 24 has its flange portion 50 bolted to the flange portion 51 of the auxiliary transmission housing 26 by suitable bolts 51. The clutch spool 47 may be shifted by means of a conveniently placed travel and feed control lever 52 pivotally mounted on top of the transmission housing 26 on a suitable rock shaft 53 journaled in a suitable bearing 54 formed in the cover plate 55 secured to the top of the housing 26 by suitable screws 56. Fixed to the rock shaft 53 is a lever arm 57 having a pin 58 fixed in its outer end which engages in a slot 59 formed in the shifter yoke 60 carried on the rod 61 fixed in the housing 26. A depending shifter fork 62 is formed integral with the shifter yoke 60 and has bifurcated ends 63 which engage in the annular groove 64 formed in the clutch spool 47 so that manipulation of the lever 52 axially shifts the spool 47. Suitable spring urged ball detent means 65 engages in one or the other of the grooves 66 or 67 in the rod 61 to normally hold the clutch spool 47 in either of its driving positions.

The back gear shaft 21 of the regular transmission 13 is connected to the by-pass take-off shaft 68 supported on the splined portion 69 of the shaft 21 and in turn having a splined end 70 engaging the regular power take-off shaft 23 in the differential housing 24 of the tractor. There has thus been provided a low speed auxiliary transmission in a conventional tractor which has been interposed between the regular transmission 13 and the differential housing 24 by which a low speed drive to the wheels of the tractor is effected and in which the power take-off drive shaft is connected to the regular transmission through a by-pass power shaft in the auxiliary transmission.

The trenching device is mounted on the tractor by means of the main supporting frame comprising a pair of upright standards or channels 71 and 72 which are welded to the brackets 73 and 74 which in turn are fixed to the differential housing 24 by suitable bolts 75. Cross channels 76 and 77 are suitably welded to the upright channels 71 and 72. Suitable angular braces 78 and 79 are riveted at 80 to the upright channels 71 and 72 and are welded at their lower ends to angle plates 81 secured to the flange portion 50 of the differential housing 24 by the bolts 51.

Figure 3:
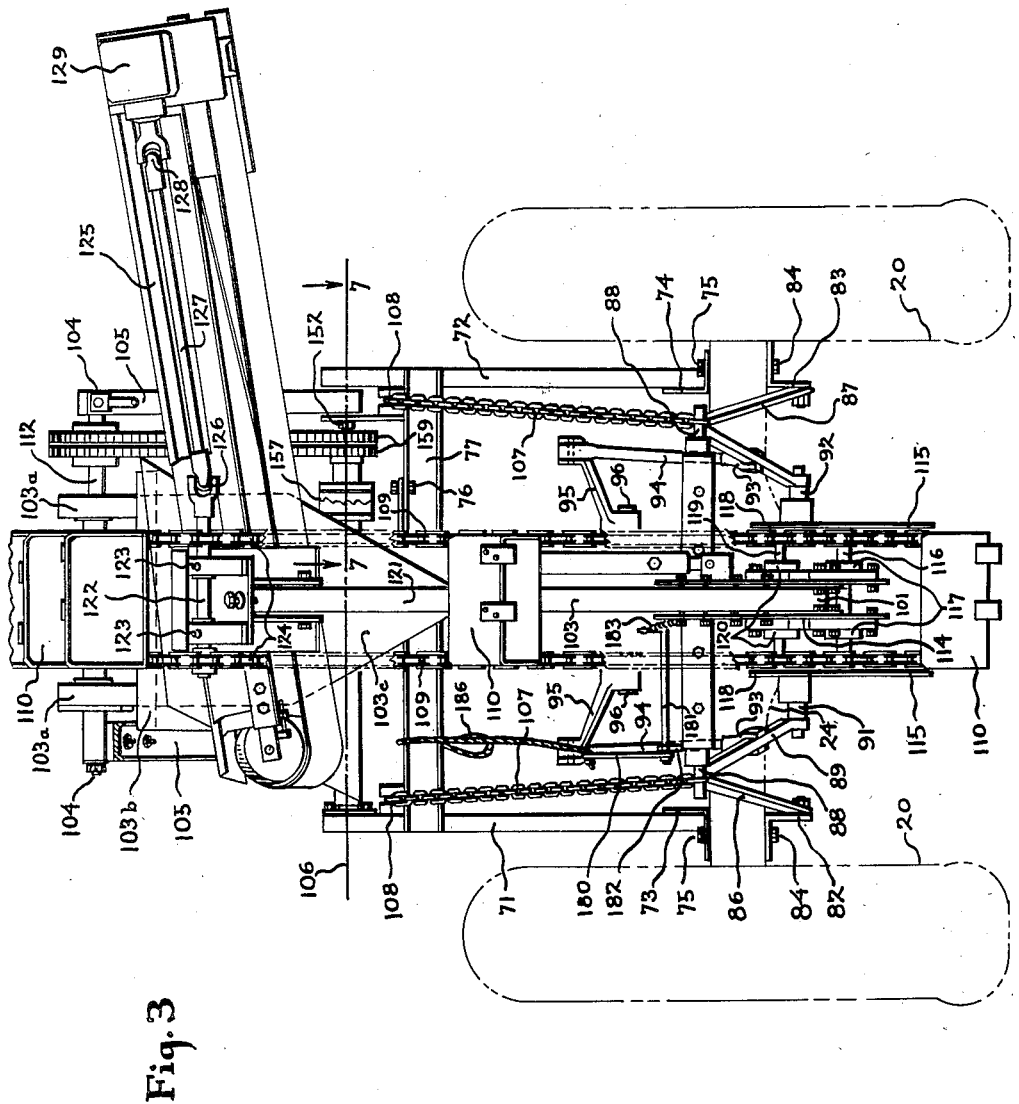
Figure 3 is a rear view of the apparatus shown in Figure 1.

Below the differential housing 24 are secured the brackets 82 and 83 by suitable bolts 84 and in these brackets are trunnions 85 upon which are pivotally mounted the stabilizer arms 86 and 87 which terminate in pivotal connections 88 to which are also connected the lifting arms 89 and 90 which are pivotally connected to the differential housing 24 by suitable trunnions 91 and 92 as best seen in Figure 3. The lift arms 89 and 90 are connected at 93 to the links 94 which in turn are connected to the lifting levers 95 carried on the rock shaft 96 journaled in the differential housing 24 of the tractor. The rock shaft 96 is actuated by the usual hydraulic cylinder 97 of the tractor having a piston 98 and a connecting rod 99 connected to a lever arm 100 fixed to the rock shaft 96 inside of the differential housing 94.

Supported pivotably at 88 on the stabilizer arms 86 and 87 and the lift arms 89 and 90 is the slide assembly or guide box member 101 which has suitable guide ways 102 in which slides the main frame or profile control bar 103. The upper end of this bar 103 is provided with channels 103a which are connected through transverse channel 103b and plate member 103c to the member 103. The upper ends of the members 103a are pivotally supported at 104 on an arm 105 which in turn are pivotally supported at 106 on the upright channel 71 and 72. Limit chains 107 fastened at 108 to the vertical channels 71 and 72 and connected to the guide box member 101 at their other ends at 108a serve to limit the downward swinging position of the stabilizer and lift arms and the guide box 101 to the position shown in Figure 1.

Figure 2:
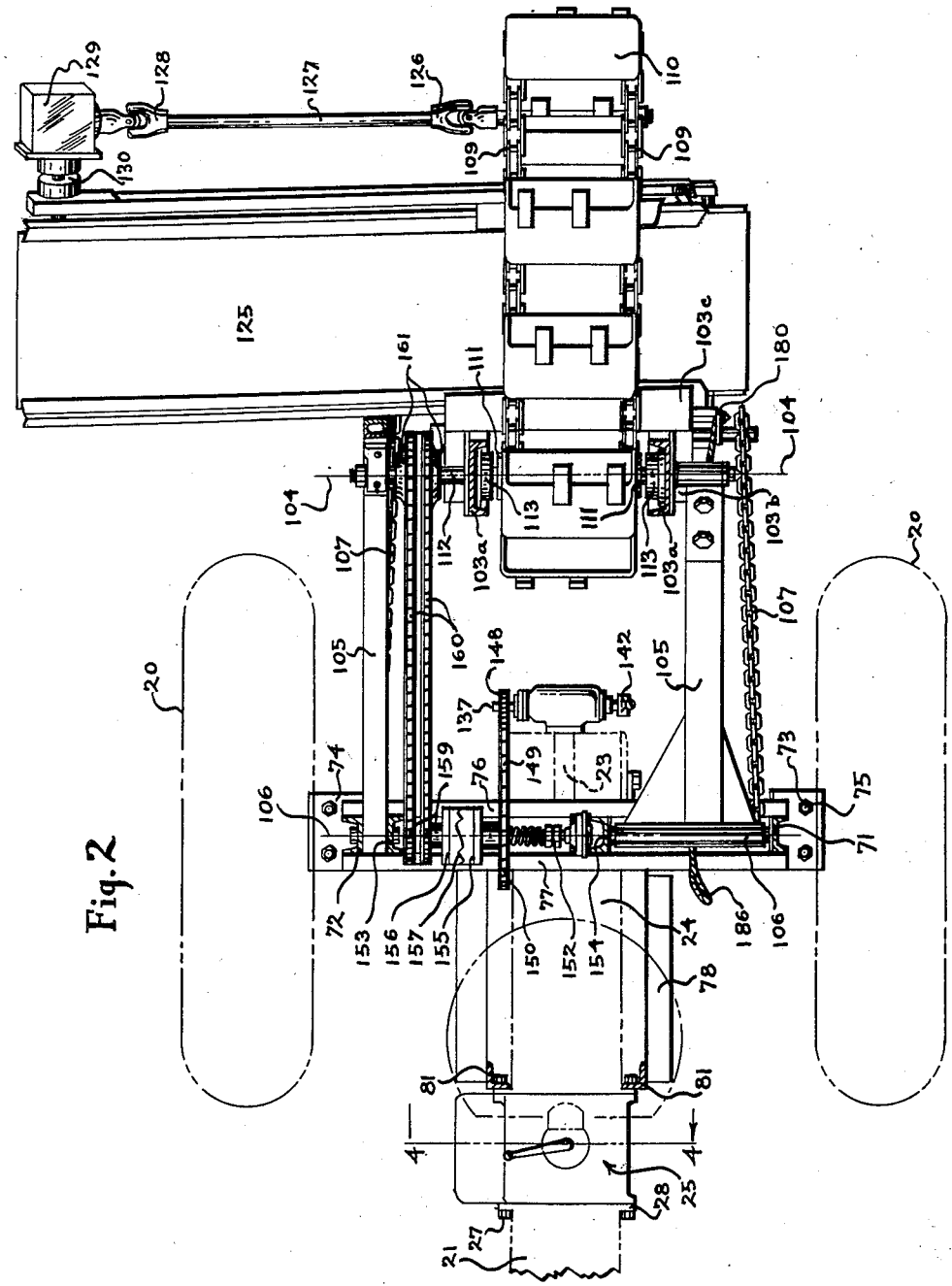
Figure 2 is a plan view of the arrangement shown in Figure 1.

The endless chain bucket line 109 having the buckets 110 is carried on the drive sprockets 111 carried on a shaft 112 journaled on suitable bearings 113 in the upper portion of the members 103a, as best seen in Figures 2 and 3, with the axis of the shaft 112 coinciding with the pivot axis 104. On the lower end of the channel 103, where it projects downwardly through the guide box 101, is fixed a supporting member 114 which carries a pair of large idler wheels 115 carried on a shaft 116 journaled in suitable bearings 117 in the member 114. A smaller pair of idler wheels 118 located toward the front and upwardly from the idler wheels 115, are fixed on a shaft 119 journaled in suitable bearings 120 in the member 114. It will be noted that the bucket chain line 109 passes downwardly over the idler wheels 115 and then diagonally upwardly along the line 109a to the smaller idler pulleys 118, as best seen in Figure 1, so that the buckets 110 pass through a greater radius of sweep in the bottom of the ditch. It will also be noted that at least two of the buckets such as 110a and 110b are digging at the same time so as to provide an overlap in the entrance and leaving of the buckets from the cut to thus greatly reduce vibration during the digging operation.

Also fixed to the member 114 is the channel member 121 which extends upwardly and rearwardly to support a shaft 122 on suitable bearings 123. On the shaft 122 are fixed the sprockets 124 over which operates the bucket chain line 109 so as to positively rotate the shaft 122. A conveyor indicated generally at 125 is mounted on and interconnects the members 103 and 121 by suitable bolts at 125a and 125b so as to rigidly hold these members together at their upper portions. Since the conveyor belt forms no specific part of this invention, it will not be described in detail herein, it being sufficient to note that the conveyor may be driven from the shaft 122 through the universal joint 126, the propeller shaft 127, and the universal joint 128 connected to the drive gear box 129 which is connected through the coupling 130 to drive the conveyor belt 125 in any suitable and well known manner.

Figure 6:
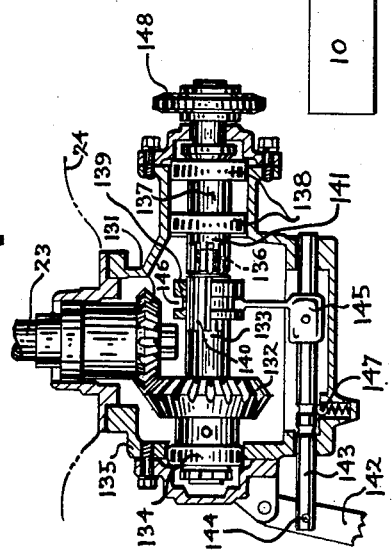
Figure 6 is an enlarged sectional view of the power take-off control unit for driving the bucket chain line indicated by the line 6—6 in Figure 1.

The bucket chain line 109 is driven from the power take-off shaft 23 of the tractor. Referring to Figure 6, the power take-off shaft 23 is provided with a bevel pinion 131 which engages a mating bevel pinion 132 fixed on the shaft 133 journaled in the bearing 134 in the housing 135 attached to the differential housing 24 of the tractor. The other end of the shaft 133 is supported in a pilot bearing 136 in the output shaft 137 journaled in suitable bearings 138 in the housing 135. A shiftable clutch spool 139 carried on the splined portion 140 of the shaft 133 may be shifted over the splined portion 141 of the shaft 137 for connecting or disconnecting the drive for starting and stopping the bucket chain line. The clutch spool 139 may be shifted by suitable control lever 142 connected to a shifter rod 143 by a suitable pin 144, a shifter yoke 145 being fixed to the rod 143 and engaging the annular slot 146 to effect the shifting of the clutch spool 139. A suitable spring urged ball detent 147 serves to position the rod 143 and the clutch spool 139 in an engaged or disengaged position.

Figure 7:
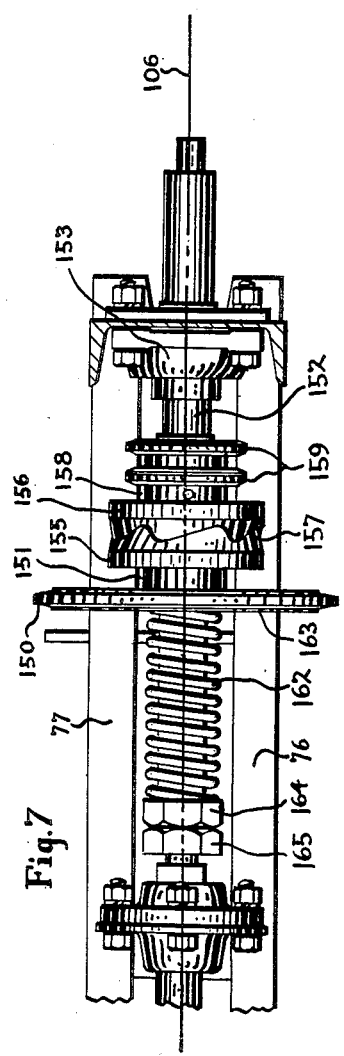
Figure 7 is an enlarged fragmentary view of the overload clutch drive shaft indicated by the line 7—7 in Figures 1 and 3.

On the outer end of the shaft 137 is fixed a sprocket 148 which drives a chain 149 operating over a sprocket 150 having a hub portion 151, Figure 7, journaled on a shaft 152 which in turn is journaled in suitable bearings 153 and 154 about the pivot axis 106 of the supporting frame upright channels 71 and 72. Fixed on the hub 151 is one member 155 of an overhead clutch having a second member 156 interengaging the member 155 through serrated teeth 157. The member 156 has a hub member 158 fixed to the shaft 152 upon which is formed a pair of chain sprockets 159 over which operate the chains 160 which operatively connect with the pair of sprockets 161 fixed on the shaft 112.

The members 155 and 156 are normally held with their teeth in engagement by means of a compression spring 162 located around the shaft 152 and confined axially against the face 163 of the sprocket 150 by an adjusting nut 164 and a locked nut 165. Should an obstruction be encountered by the bucket train so as to overload the drive transmission for the bucket chain line, the clutch members 155 and 156 will slip relative to one another compressing the spring 162 as the high points of the serrations 157 ride over one another. As soon as the obstruction has been removed, resumption of the normal drive immediately takes place.

The raising and lowering of the bucket chain line is controlled hydraulically in a unique manner. Referring particularly to Figures 1 and 8, the usual hydraulic pump 166 of the tractor is connected to be driven from the power take-off shaft 23 and receives a supply of fluid from a suitable fluid reservoir 167 in the bottom of the differential housing 24. Pressure from the pump 166 is delivered through a supply line 168 to a control valve 169 operated by a suitable manual control member 170 conveniently placed for manipulation by the operator. A suitable pressure relief valve 171 is provided in the pressure line 168 to regulate the maximum pressure in this line to prevent damage to the hydraulic circuit. The discharge line 172 from the control valve 169 is connected to the pressure chamber 173 of the cylinder 97 and through a flexible conduit 174 to the pressure chamber 175 of the profile control cylinder 176 which cylinder has its piston rod 178 pivotally connected at its upper end at 177 to the member 103, the cylinder being pivotally connected at 179 to the guide box 101.

When the lever 170 is operated to open the valve 169 fluid pressure is applied simultaneously to both cylinders 97 and 176 so that the member 103 will be held in its uppermost position as shown in Figure 1 and the stabilizing and lift arms will be raised by the levers 95 allowing the limit chains 107 to sag while the trenching device as a whole is swung upwardly around the pivot axes 85, 88, 104 and 106 to raise the trenching device bodily above normal operating position shown in Figure 1. In this position the apparatus is in condition to be hauled about on the tractor to the location of the work to be done.

After the tractor has been driven to the desired position to start the digging operation, the operator manipulates the control lever 52 on the auxiliary transmission to shift in the low feeding speed drive as described. He then closes the valve 169 releasing pressure from the cylinders 97 and 176. Release of pressure from the cylinder 97 allows the trenching device as a whole to swing down to operating position where it is held by the limit chains 107. A latch device, Figure 1, comprising a lever 180 mounted on a rock shaft 181 carried on a suitable bracket 182 fixed to the member 101, has a latch arm 183 adapted to engage various stop notches 184 in the member 103 is normally held into these notches by suitable tension spring 185 interconnected between the latch member 183 and the member 101. The operator pulls the release cord 186 which allows the member 103 to drop down to any desired depth of ditch.

The position of the member 103 for regulating the profile of the bottom of the ditch being cut, may be readily controlled by manipulating the control valve 169 and the latch cord 186 without causing operation of the cylinder 197. The arrangement of the pivotal mounting 85, 88, 106 and 104 is such that a much greater pressure is required in the cylinder 97 to operate the lifting action than is required to move the member 103 relative to the member 101 by the cylinder 176. Thus after the completion of the digging operation, this arrangement provides means for automatically sequentially lifting first the member 103 to the top of its stroke as shown in Figure 5 when the valve 169 is opened, and then upon continued application of fluid pressure after the conclusion of the movement of the piston rod 178 to the top of its stroke, pressure further builds up to cause the cylinder 97 to then operate to bodily raise the entire ditching apparatus to position to be transported to another job.

Having thus fully set forth and described this invention, what is claimed is:

1. In a trenching machine tractor auxiliary transmission, a housing, means for securing said housing between the regular transmission case and the rear axle housing of the tractor, an input shaft in said auxiliary transmission connected to be driven from the axle drive output of said regular transmission, an output shaft from said auxiliary transmission connected to the differential axle drive transmission in said rear axle housing, a low speed transmission gear set in said auxiliary transmission housing driven from said input shaft, means for alternately connecting said output from said low speed transmission or the input shaft of said auxiliary transmission to the output shaft from said transmission and a bypass shaft carried in said auxiliary transmission housing having one end connected to the output back gear shaft of said regular tractor transmission and its other end connected to the power takeoff drive shaft in the differential housing of said tractor.

2. An auxiliary transmission for altering a standard tractor for trenching operations comprising a housing, means for securing said housing between the regular transmission drive and the rear axle differential drive of a standard tractor including an input shaft journaled in said housing, connected in driving alignment with the output wheel drive shaft of said regular transmission of the tractor, an output shaft journaled in said housing in alignment with said input shaft and connected to drive the wheels of said standard tractor, a bypass shaft journaled in said housing connected in driving alignment with the accessory drive shaft from the regular transmission of said tractor and connected at its output end with the accessory drive shaft in the differential housing of said tractor.

3. An auxiliary transmission for altering a standard tractor for trenching operations comprising a housing, means for securing said housing between the regular transmission drive and the rear axle differential drive of a standard tractor including an input shaft journaled in said housing, connected in driving alignment with the output wheel drive shaft of said regular transmission of the tractor, an output shaft journaled in said housing in alignment with said input shaft and connected to drive the wheels of said standard tractor, a bypass shaft journaled in said housing connected in driving alignment with the accessory drive shaft from the regular transmission of said tractor and connected at its output end with the accessory drive shaft in the differential housing of said tractor, a low speed gear train assembly journaled in said housing connected to be driven from the input shaft of said auxiliary transmission at all times, a final output gear in said low speed gear set journaled on the output shaft of said auxiliary transmission, and positive clutch means for alternately connecting the output shaft of said auxiliary transmission directly to the input shaft of said transmission or to the output gear of said slow speed gear set.

4. A slow speed auxiliary transmission for a standard tractor comprising a housing, means for intersecuring said transmission between the standard transmission and the rear axle housing of said tractor, a bypass shaft journaled in said transmission interconnecting the accessory drive output of said standard transmission with the accessory drive shaft in the differential housing of said tractor, and a slow speed drive transmission in said auxiliary transmission housing including an input and output shaft independently journaled for rotation about an axis coinciding with the output wheel drive from said standard transmission and the propeller shaft drive of the differential gearing in the rear axle housing of said standard tractor.

5. A slow speed auxiliary transmission for a standard tractor comprising a housing, means for intersecuring said transmission between the standard transmission and the rear axle housing of said tractor, a bypass shaft journaled in said transmission interconnecting the accessory drive output of said standard transmission with the accessory drive shaft in the differential housing of said tractor, and a slow speed drive transmission in said auxiliary transmission housing including an input and output shaft independently journaled for rotation about an axis coinciding with the output wheel drive from said standard transmission and the propeller shaft drive of the differential gearing in the rear axle housing of said standard tractor, and low speed gearing including first and second intermediate shafts, a pair of compound reducing gears journaled on said first intermediate shaft, a single compound gear journaled on said second intermediate shaft, means for driving one of said compound gears on said first intermediate shaft from the input shaft of said auxiliary transmission, and a final output gear journaled on the output shaft of said transmission driven from the other of said compound gears on said first intermediate shaft, and means for interconnecting both of said compound gears on said first intermediate shaft through the single set of compound gears on said second intermediate shaft to provide a low speed drive between the input shaft and the output final gear of said auxiliary transmission.

6. A slow speed auxiliary transmission for a standard tractor comprising a housing, means for intersecuring said transmission between the standard transmission and the rear axle housing of said tractor, a bypass shaft journaled in said transmission interconnecting the accessory drive output of said standard transmission with the accessory drive shaft in the differential housing of said tractor, and a slow speed drive transmission in said auxiliary transmission housing including an input and output shaft independently journaled for rotation about an axis coinciding with the output wheel drive shaft from said standard transmission and the propeller shaft drive of the differential gearing in the rear axle housing of said standard tractor, and low speed gearing including first and second intermediate shafts, a pair of compound reducing gears journaled on said first intermediate shaft, a single compound gear journaled on said second intermediate shaft, means for driving one of said compound gears on said first intermediate shaft from the input shaft of said auxiliary transmission, a final output gear journaled on the output shaft of said transmission driven from the other of said compound gears on said first intermediate shaft, and means for interconnecting both of said compound gears on said first intermediate shaft through said single compound gear on said second intermediate shaft to provide a low speed drive between the input shaft and the final output gear of said auxiliary transmission, including clutch means for alternately directly interconnecting said input and output shafts of said auxiliary transmission or connecting said output shaft to said final output gear of said low speed gear set.

WOODROW W. EVERETT.

(References on following page)

REFERENCES CITED

The following references are of record in the file of this patent:

UNITED STATES PATENTS

| Number | Name | Date |
|---|---|---|
| 1,465,622 | Bittner | Aug. 21, 1923 |
| 1,520,735 | Webb | Dec. 30, 1924 |
| 1,756,971 | Brown | May 6, 1930 |
| 1,782,478 | Ruth | Nov. 25, 1930 |
| 1,916,247 | Barber | July 4, 1933 |
| 2,168,033 | Johnston et al. | Aug. 1, 1939 |
| 2,231,983 | Zuckerman | Feb. 18, 1941 |
| 2,241,002 | Peterson | May 6, 1941 |
| 2,259,659 | Penote et al. | Oct. 21, 1941 |
| 2,280,004 | Penote et al. | Apr. 14, 1942 |
| 2,343,733 | Backus | Mar. 7, 1944 |
| 2,397,587 | Armantrout | Apr. 2, 1946 |